(12) United States Patent
Upadhyay et al.

(10) Patent No.: US 10,977,733 B2
(45) Date of Patent: Apr. 13, 2021

(54) SYSTEM AND METHOD FOR AUTOMATED FUNDS MANAGEMENT

(71) Applicant: Ameriprise Financial, Inc, Minneapolis, MN (US)

(72) Inventors: Ravi R. Upadhyay, Gurgaon (IN); Michael J. Newman, Minneapolis, MN (US)

(73) Assignee: AMERIPRISE FINANCIAL, INC., Minneapolis, MN (US)

(*) Notice: Subject to any disclaimer, the term of this patent is extended or adjusted under 35 U.S.C. 154(b) by 28 days.

(21) Appl. No.: 13/665,447

(22) Filed: Oct. 31, 2012

(65) Prior Publication Data
US 2013/0124231 A1    May 16, 2013

(51) Int. Cl.
G06Q 40/00 (2012.01)
G06Q 40/08 (2012.01)
G06Q 40/04 (2012.01)

(52) U.S. Cl.
CPC ............. *G06Q 40/08* (2013.01); *G06Q 40/04* (2013.01)

(58) Field of Classification Search
CPC .................................................. G06Q 40/08
USPC ....................................................... 705/36
See application file for complete search history.

(56) References Cited

U.S. PATENT DOCUMENTS

| | | | | |
|---|---|---|---|---|
| 6,064,985 A | * | 5/2000 | Anderson | G06Q 40/06 705/36 R |
| 2002/0138383 A1 | * | 9/2002 | Rhee | G06Q 40/04 705/36 R |

* cited by examiner

*Primary Examiner* — Edward Chang
(74) *Attorney, Agent, or Firm* — McDonnell Boehnen Hulbert & Berghoff LLP

(57) ABSTRACT

An automated funds management system and in particular a system and a method to at least ensure the payment of guaranteed minimum income benefit ("GMIB") based on the automated sector based allocation of funds in a variable annuity. A contract holder's profile data is evaluated and a profile score is computed based on the evaluated profile data. The GMIB payment stream value is computed based on the available profile data and the assigned profile score. An appropriate asset class percentage allocation of contract holder funds is recommended based on the assigned profile score and the computed GMIB payment stream value. Appropriate subaccounts are identified based on the defined asset class percentage allocation of contract holder funds, GMIB payment stream value, and/or profile score. The changes in the value of at least one market index are captured and based on a pre-determined change in the value of at least one market index, at least a portion of the invested contract holder funds are reallocated into relatively better performing market sector based subaccounts.

11 Claims, 4 Drawing Sheets

SYSTEM AND METHOD FOR AUTOMATED FUNDS MANAGEMENT

CROSS-REFERENCE TO RELATED APPLICATIONS

This application claims priority from Indian Patent Application No. 3202/DEL/2011 filed on Nov. 11, 2011, which is hereby incorporated by reference in its entirety.

FIELD OF DISCLOSURE

The present disclosure relates to a system and method for automated funds management within a variable annuity contract. More specifically, the system and method automatically determine investment adjustments to be made to the subaccount investments in a variable annuity contract in dynamic market conditions so as to minimize the risk to an insurance company's ability to pay a guaranteed benefit stream to the contract holder, while giving the contract holder the advantage of moving the subaccount investments to higher-performing market sectors within her previously indicated risk profile via an automated, sector-based allocation of the invested funds.

BACKGROUND

Annuities are tax-deferred savings vehicles packaged as an insurance product. They are used to provide periodic, regular payments to an investor, who is alternatively known as the contract holder. Annuities are majorly of two types: fixed annuities and variable annuities. In a variable annuity, the initial investment is allocated to subaccounts that are then invested in stocks, bonds, certificates of deposit and the like depending upon the type of subaccount chosen. Usually, the subaccount is selected based on the level of risk and return desired from the annuity. The account value of a variable annuity will vary depending on the performance of the investment options (i.e., the subaccounts) the contract holder has chosen. Consequently, the amount of the benefit payments to the contract holder can vary depending on the performance of the subaccount investments. Insurance companies offer riders for sale that if purchased by the contract holder, will guarantee a minimum level of benefit payment (e.g., a percentage of the invested amount such as 5% or 6%) as long as the other conditions of the annuity contract are followed by the contract holder (e.g., only 5% is withdrawn in a contract year).

In a scenario in which the performance trend of the financial markets is generally positive, it is likely the value of investment options in the subaccounts of the variable annuity will appreciate, and the contract holder will get good return on the invested amount. However, in a down-market scenario where the contract holder has not purchased a guarantee-bearing rider, the account value of the investment options can, absent adjustments, diminish and thereby depredate the account value presenting the risk that the contract holder can lose the principal investment made into a variable annuity.

The known methods and systems for reducing the downside investment risk involved in purchasing a variable annuity product focus mainly on protecting the principal investment by making corrective adjustments to the subaccount investments only after the account value has diminished during negative market conditions. By monitoring the depreciation of the variable annuity's overall account value to determine when to make corrective adjustments during negative market conditions, these known methods and systems manage only the magnitude of the loss in the investment. That is, in most cases these known methods and systems make adjustments toward a more conservative or passive investment portfolio comprising mostly of bonds, certificate deposits, fixed deposits that provide for fixed and/or lower rate of return during negative market conditions.

Other known methods and systems provide for adjustments within the investment portfolio of the variable annuity in order to ensure payment of the Guaranteed Minimum Income Benefit ("GMIB") amount at the expense of other goals of the investment product. For example, an investment product may include a strategy whereby the initial investment is split with the intention of having a set of subaccounts designated for ensuring the payment to the contract holder of a benefit stream and a second set of subaccounts the objective of which is to provide a benefit to designated beneficiaries. However, in down markets, changes are made to the investments in the portfolio to the advantage of the first set of subaccounts when the account value of the annuity falls below the level required to meet the guaranty to the contract holder or the account value falls below a certain defined threshold level. In summary, these methods and systems make changes to the investment portfolios that are entirely dependent on the account value of the variable annuity product. Thus, in spite of trending negative market conditions, the corrective adjustments are not timely actuated within the account portfolio in order to ensure safety of the contract holder funds until after there is an actual, realizable downward movement of the account value.

In certain other scenarios manual intervention is required by the insurance company and/or the financial representative associated with the investment portfolio in order to initiate corrective adjustments when notice is taken that the account value of the variable annuity product is below the amount required to support the GMIB payment stream and/or has diminished below a certain, defined threshold level. That is, the insurance company or the contract owner's financial representative helps the contract holder seek safety for the contract holder's account value by entering manually the transactions required to move the funds into different subaccount investments. The foregoing situation leads to the immediate realization of a financial loss for the contract holder, because the corrective adjustments are initiated only after the account value of the variable annuity product has diminished in value.

It is not uncommon, during negative market conditions, for the market experts and wealth managers to recommend that an investor stay invested in a given portfolio mix in the hope that the market sectors in which the investor's funds have been invested will recover from a current downturn. Further, during positive market conditions, typical recommendations are made to stay invested in the exposed portfolio to further benefit from the market boom. Many times the aforementioned investment recommendations are made without accounting for risk factors in a growing portfolio or even the believed-to-be safer haven of the more conservative portfolio. We believe a better method and system can be designed to account for specific sectors that are doing comparatively better than those sectors in which the contract holder funds are currently invested or to which they have been moved in down-market conditions.

Moreover, as the contract holder approaches retirement, traditional advice involves the recommendation to move the contract holder's investments toward passive funds for management via a conservative portfolio for more reliable, short-term returns. This passive investment strategy, while reliable over time, can preclude the contract holder from taking advantage of sustained positive market conditions. Furthermore, where the contract holder has not been able to achieve critical financial goals (e.g., buying a house in a more desirable location, funding a child's education) prior to retirement due to sustained negative market conditions, loss of income and the like, such strategies force the contract holder to compromise on the dollar and time value one can attribute in realizing the pending financial goals.

The above-described methods and systems depend on fluctuations in the account value of the variable annuity as the trigger to make adjustments to the underlying investments to mitigate, and not avoid, the level of depreciation in the account value of the variable annuity product. Moreover, the adjustments often take place only when the account value of the variable annuity product has drastically diminished to a level below that which is required to support the GMIB payment stream.

In such existing, account-value-dependent methods and systems, the changes to the investment portfolio are not directly related to the increase or decrease in the value of a market index. The known methods and systems do not account for and take advantage of the upward or downward trends in a particular market sector and/or market indices in order to proactively safeguard, or provide benefit to, the account value of the variable annuity product.

Accordingly, the present disclosure describes an automated funds management system and method, and, in particular, a system and method for ensuring the payment of a guaranteed benefit stream based on the automated, sector-based allocation of funds in a variable annuity.

SUMMARY

The disclosed automated funds management system and method include a profile evaluator, an asset identifier, an asset allocator, and an index evaluator. The profile evaluator extracts contract-holder related data from various networked databases in order to evaluate the profile of a given contract holder. The profile evaluator computes and assigns a profile score to the profile of the contract holder. Further, the profile evaluator determines a GMIB payment stream value required by the contract holder to timely fulfill its goals based on the supplied profile data and the assigned profile score. The appropriate portfolio recommendation depends on the profile score and the required GMIB payment stream value assigned by the profile evaluator to the overall profile of the contract holder. The asset identifier firstly provides recommendations for percentage distribution of funds into given asset classes, and secondly suggests the right set of subaccounts belonging to the respective asset classes for the implementation of said distribution. Said recommendations and the identification of subaccounts depend on the profile score and the GMIB payment stream value that the profile evaluator assigns to the overall profile of the contract holder. The asset identifier is connected to the various databases providing information relating to the subaccounts, financial markets, financial products, financial organizations, and/or financial governing bodies such as Financial Industry Regulatory Authority (FINRA), Securities and Exchange Commission (SEC), Municipal Securities Rulemaking Board (MSRB) and the like. The asset identifier extracts data relating to the various financial products from the connected databases. The asset allocator allocates the contract holder funds into the subaccounts recommended by the asset identifier based on the profile score and the required GMIB payment stream value for the contract holder. The index evaluator captures the changes in the value of the market index. Further, the index evaluator evaluates the performance of each market sector that defines the market index. The index evaluator rates the performance of each market sector that defines the market index. The market sectors may include, but need not be limited to, Automobile and Ancillary, Technology, Banking, Manufacturing, FMCG (Fast Moving Consumer Goods), Healthcare, Telecom, Energy, Real estate, and Infrastructure among others. Additional market sectors may be added and any of the foregoing may be subtracted as desired. The index evaluator has a risk scale on which the performance of various market sectors is relatively compared. The parameters considered to ascertain the performance of every market sector include, but need not be limited to, return on investment of a financial market sector for a specific time period, sustenance of a particular financial market sector during dynamic market conditions and/or the amount of volatility experienced by the various market sectors in the defined time period. The various sectors are relatively compared on the above-mentioned parameters and are rated or weighed on a scale of, for example, one (1) to ten (10), with one (1) being the lowest and ten (10) being the highest. Other scale increments and boundaries may be substituted. If the change in the value of the market index is at least by a predetermined threshold level, then the asset allocator reallocates at least a portion of the contract holder funds into at least one market sector performing relatively better than the other market sectors.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
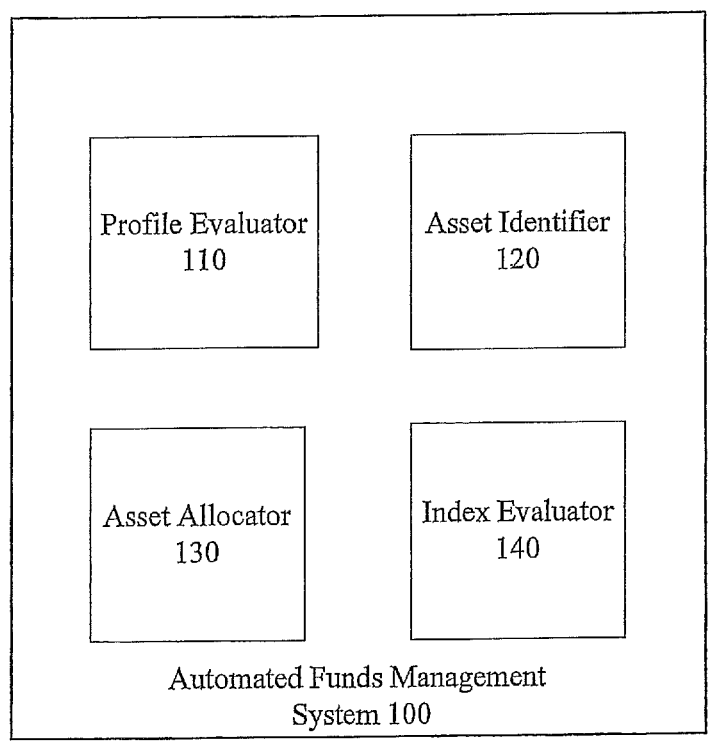
FIG. 1 illustrates an exemplary block diagram of the functional architecture for the system and method of the present disclosure.

The present disclosure relates to a system and method for automated funds management within a variable annuity contract. More specifically, the system and method automatically determine investment adjustments to be made to the subaccount investments in a variable annuity contract in dynamic market conditions so as to minimize the risk to an insurance company's ability to pay a guaranteed benefit stream to the contract holder, while giving the contract holder the advantage of moving the subaccount investments to relatively higher-performing market sectors within the previously indicated risk profile via an automated sector based allocation of the invested funds. The GMIB is a living benefit coupled with a variable annuity contract. The GMIB ensures that the contract holders are at least paid a guaranteed, fixed-percentage return on their total investment made into an annuity product, irrespective of the market performance. In one embodiment, the contract holder is an individual, organization, natural person, legal entity, or group of persons. In some insurance company supported variable annuity products, the insurance companies offer riders for sale that if purchased by the contract holder, will guarantee a minimum level of benefit payment (e.g., a percentage of the invested amount such as 5% or 6%) for the life of the contract holder as long as the other conditions of the annuity contract are followed by the contract holder (e.g., only 5% is withdrawn in a contract year). Other riders may, for example, be offered for purchase in order to provide a death benefit or long-term care options.

For example, assume a contract holder invests $250,000 in an annuity contract with a GMIB payment stream rider that guarantees the greater of a) the actual value, b) 6% interest compounded annually, or c) the highest contract anniversary value of the annuity: Ten years But with the GMIB payment stream provision of the annuity the contract holder has the additional option of being able to "annuitize" $447,712 ($250,000 compounded annually for ten years at 6%) by taking a stream of income payments suited to the contract holder needs. In the above example, the described situation is a loss for both the contract holder and the guarantor.

In one embodiment, the performance trend of the financial markets is negative, and the total value of the contract holder investment in a variable annuity contract is below the GMIB payment stream level, then as per the present disclosure part of the contract holder funds forming a part of a variable annuity contract investment is moved into relatively better performing market sectors or market segments providing support to the value of the market index. The movement/reallocation of funds into various market sectors depends on the performance of each market sector governing the market index. The parameters considered to ascertain the performance of every market sector include, but need not be limited to, return on investment of a sector for a specific time period, sustenance of a particular market sector during dynamic market conditions, and amount of volatility experienced by the sectors in the defined time period. The performance of a particular market sector for a specific time period is determined based on the relative comparison of that particular market sector with the rest of the market sectors. For example, if market sector A is giving 10% annual rate of return on a given amount of $1,000 and market sector B is giving 8.5% annual rate of return for the same amount, then the decision of investment into a particular market sector depends on the volatile nature of the return provided by the selected market sector A or market sector B. The market sector, which has experienced less volatility in the given time period, which provides a guaranteed rate of return, which provides comparatively long term investment option, and which involves less financial risk for both the guarantor of the variable annuity product and the contract holder is selected.

The following disclosure relates to a system and method for automated funds management within a variable annuity contract. More specifically, the system and method automatically determine the investment adjustments to be made to the subaccount investments in a variable annuity contract in dynamic market conditions so as to minimize the risk to an insurance company's ability to pay a guaranteed benefit stream to the contract holder, while giving the contract holder the advantage of moving the subaccount investments to higher-performing market sectors within the previously indicated risk profile via an automated sector-based allocation of the invested funds. While aspects of described systems and methods for ensuring the payment of GMIB payment stream can be implemented in any number of different computing systems, environments, and/or configurations, embodiments for payment of GMIB stream are described in the context of the following exemplary systems(s) and method(s).

FIG. 1 illustrates the block diagram of the functional architecture for the system and method of the present disclosure. In one embodiment the functional architecture of the automated funds management system 100 contains a profile evaluator 110, which extracts profile data from at least one database. In one embodiment, the database is remotely connected to the funds management system 100 via a network. The profile data is detailed and includes, but need not be limited to, age, marital status, gender of the contract holder, and those of the beneficiary, details relating to the assets and liabilities, information relating to the number of dependents, financial goals, and their priority in terms of dollar value and timing, anticipated expenses, anticipated income, anticipated large expenditures such as educational expenses, buying a house, annual travel budget, and the like. The profile evaluator 110 evaluates the profile of the contract holder based on the supplied information and scores the profile on a scale of one (1) to ten (10). A profile score of one (1) is assigned to the most conservative contract holder financial profile, and a profile score of ten (10) is assigned to the most aggressive contract holder financial profile. In one embodiment, a score of one (1) to three (3) is considered under the conservative section, a score of four (4) to seven (7) is considered under the balanced section, and a score of eight (8) to ten (10) is considered under the growth section. Other scale increments and boundaries may be substituted to ascertain the profile score. In one embodiment, the profile evaluator 110 based on the evaluation of the profile data and the assigned profile score computes the GMIB payment stream value required to be paid to the contract holder. The GMIB payment stream value is regularly reviewed and is updated (if required) based on, for example, the changes in the market scenario and/or within the profile data of the contract holder.

In one embodiment, the funds management system 100 includes an asset identifier 120 that firstly provides recommendations for percentage distribution of funds into given asset classes, and secondly suggests the right set of subaccounts belonging to the respective asset classes. The provided recommendations for percentage distribution of funds into given asset classes and the identification of subaccounts depends on the profile score and the GMIB payment stream value that the profile evaluator assigns to the overall profile of the contract holder. The asset classes include, but need not be limited to, stocks and equities, fixed income or bonds, money market or cash equivalents, and real estate or other tangible assets.

In one embodiment, a profile with a score of three (3) will have more of passive investments or conservative subaccounts such as federal bonds, certificate deposits, recurring deposits, and fixed deposits. In one embodiment, the passive investments are those with fixed rate of return on the investment. In one embodiment, a profile with a score of six (6) will have a mix of passive investments and actively managed equity based investments. In one embodiment, the actively managed equity based investments include, but need not be limited to, market exposed mutual funds, Exchange Traded Funds (ETFs), sector based funds, shares, futures, derivatives, options and the like. In one embodiment, a profile with a score of nine (9) will have more of actively managed equity based investments such as mutual funds, Exchange Traded Funds (ETFs), sector based funds, shares, futures, derivatives, options and the like.

The asset identifier 120 is connected to various databases of third party financial institutions, banking and non-banking financial organizations, financial planning organizations, financial advisor blogs, finance-based web portals and any networked medium providing direct and/or indirect information on financial products and/or financial market sector performance and other data. In one embodiment, the database is an internal database maintaining the details of the available financial products. In one embodiment, the provided automated recommendations and suggestions relating to percentage distribution of contract holder funds into various asset classes and subaccounts can be changed by the operator of the funds management system 100. In one embodiment, the operator is a financial advisor, contract holder, and guarantor of the variable annuity and/or the beneficiary, among others.

In one embodiment, the funds management system 100 includes an asset allocator 130 for automated allocation of the funds into the asset identifier 120 identified subaccounts based on the defined asset class percentage distribution. In one embodiment, the automated funds management system 100 includes an index evaluator 140 for determining the change in the value of at least one market index. A change in the value of the market index by a predetermined numeric value, percentage value or other metric actuates the asset allocator 130 to reallocate at least a portion of the funds into financial sectors, subaccounts, and/or financial products providing support to the value of the market index. In one embodiment, the market sectors include, but need not be limited to, Automobile and Ancillary, Technology, Banking, Manufacturing, Fast Moving Consumer Goods (FMCG), Healthcare, Telecom, Energy, Real estate, and Infrastructure. In one embodiment, the change in the value of the market index is captured in set percentage form and/or in set numeric value form.

Figure 2A:
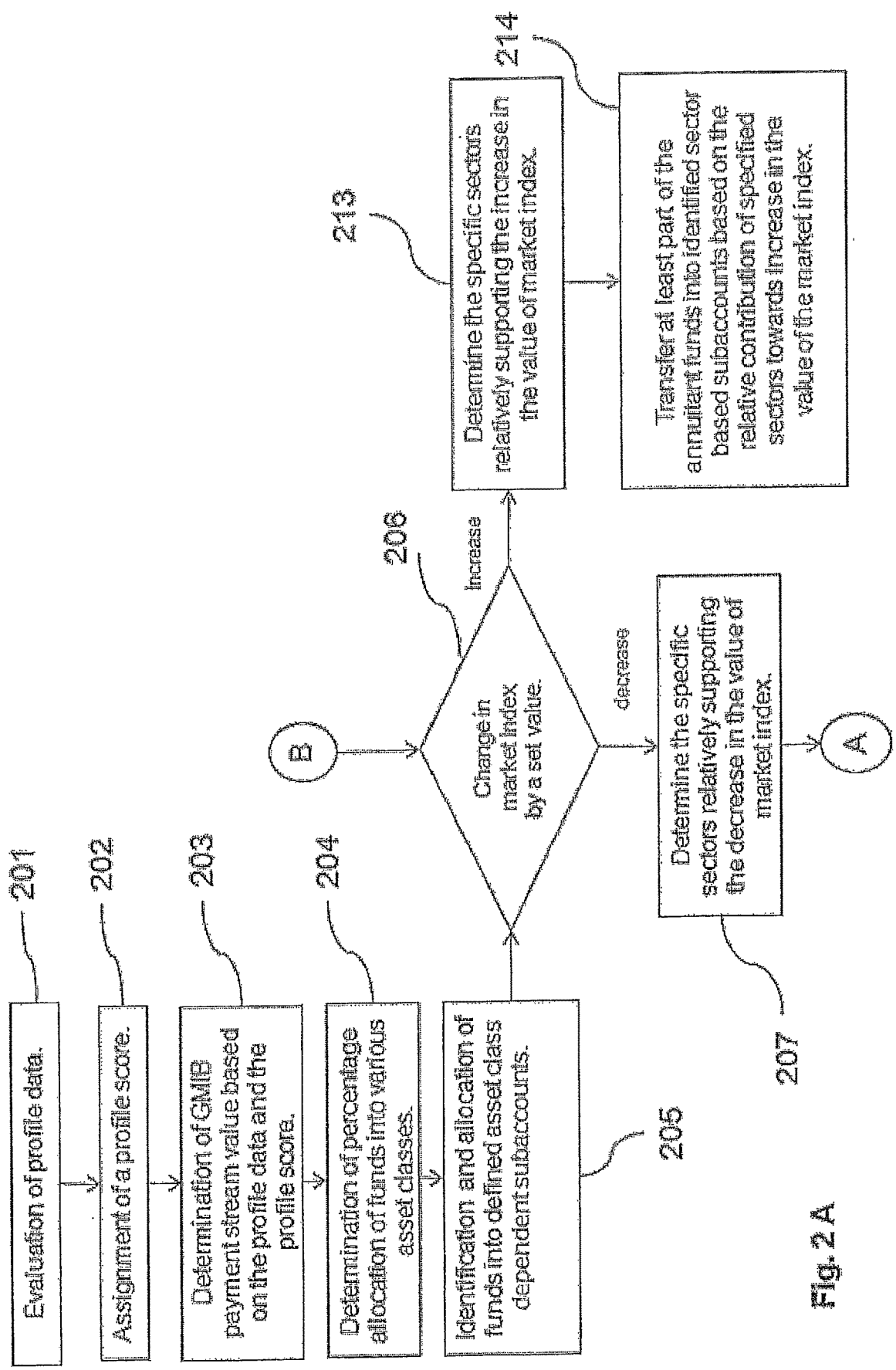
FIGS. 2A and 2B illustrate exemplary flow diagrams, which represent the automated operational steps of the funds management system and method as per one aspect of the present disclosure.

FIGS. 2A and 2B illustrate flow diagrams, which represent the automated operational steps of the funds management system 100 for a variable annuity product. The automated operational steps will be described with reference to the devices, modules, system and/or architecture described in FIG. 1 and FIG. 3. In one embodiment, the automated operational steps begin with evaluation of the profile data by the profile evaluator 110 of the fund management system 100 at block 201. The profile data includes, but need not be limited to, age, marital status, gender of the contract holder, and those of the beneficiary, details relating to the assets and liabilities, information relating to the number of dependents, financial goals, and their priority in terms of dollar value and timing, anticipated expenses, anticipated income, anticipated large expenditures such as educational expenses, buying a house, annual travel budget, and the like. At block 202, the profile evaluator 110 assigns a profile score to the profile of the contract holder in the range of one (1) to ten (10), though other ranges may be substituted. In one embodiment, at block 203, the profile evaluator 110 determines the GMIB payment stream value required by the contract holder to timely fulfill its goals and lifestyle requirements, and such determination is based on the supplied profile data and the assigned profile score.

At block 204, the asset identifier 120, based on the assigned profile score by the profile evaluator 110, recommends the appropriate percentage allocation of contract holder funds into various asset classes. The asset classes include, but need not be limited to, stocks and equities, fixed income or bonds, money market or cash equivalents, and real estate or other tangible assets. In one embodiment, the provided automated percentage allocation of contract holder funds into various asset classes can be changed by the operator of the funds management system 100. In one embodiment, the operator is a financial advisor, contract holder, wealth manager, and guarantor of the variable annuity and/or the beneficiary, among others.

At block 205, the asset allocator 130, based on the profile score, firstly provides for identification of respective asset class dependent subaccounts, and secondly provides for allocation of contract holder funds into those identified subaccounts. In one embodiment, eighty percent (80%) of the funds of a contract holder with a profile score of two (2) are initially allocated into fixed income or bonds asset class related subaccounts that provide security for the principle amount and fixed rate of return. In one embodiment, fixed income or bonds asset class related subaccounts include, but need not be limited to, federal bonds, certificate deposits, and other secured fixed return based investments. The remaining twenty percent (20%) of the contract holder funds are allocated into stocks and equities asset class related subaccounts. The stocks and equities asset class related subaccounts include, but need not be limited to, mutual funds, hedge funds, unit linked life insurance, direct investment into shares and equity, managed futures and options, derivatives, and sector based indices funds, among others.

The method and system disclosed herein can be used in different combinations of allocation of funds. In one embodiment, the initial distribution/allocation of contract holder funds is done manually by a financial advisor, the organization, the contract holder, the beneficiary, stock broker, wealth manager, market trader and/or the operator of the funds management system 100.

In one embodiment, at block 206, the index evaluator 140 of the funds management system 100 determines the change in the value of the market index. In one embodiment, the change in the value of the market index is a decrease in the value of the market index by at least a pre-determined fixed percentage value, or a set numeric value, and/or a set threshold level. At block 207, the index evaluator 140 determines the specific market sectors and their relative contribution towards supporting the decrease in the value of the market index. At block 208, the index evaluator 140 on a predetermined decrease in the value of the market index compares the current value of the market index to a previously sustained value of the market index. The previously sustained value of the market index is the value of the index at which the last reallocation of funds was actuated by the asset allocator 130. A different measurement period may be used and can be, for example, a set time period such as quarterly. In one embodiment, the previously sustained value of the market index is the initial value of the market index at which the initial allocation of the contract holder funds was actuated.

At block 209, if the current value of the market index is less than the previously sustained value of the market index, then the index evaluator 140 compares the present value of the market index to the required value of the market index to determine whether the GMIB payment stream to the contract holder is still viable. At block 210, if the present value of the market index is less than the required value of the market index to ensure the GMIB payment stream to the contract holder, then the asset allocator 130 reallocates the contract holder funds in order to at least meet the GMIB payment stream levels. The contract holder funds are reallocated into performing market sectors providing support to the value of the market index. In one embodiment, if the percentage allocation in respective asset classes is unable to meet the GMIB payment levels, then the asset allocator actuates the required percentage allocation changes within the asset classes in order to at least meet the GMIB payment levels.

In an exemplary scenario, ninety percent (90%) of the funds of a contract holder with a profile score of one (1) are allocated into federal bonds, certificate deposits and other secured fixed return based subaccounts. The remaining ten percent (10%) of the contract holder funds are exposed to equity based subaccounts such as mutual funds, hedge funds, unit linked life insurance, direct investment into shares and equity, managed futures and options, derivatives, and sector based indices, among others. The asset allocator 130, in order to meet the GMIB payment stream levels, first reallocates said ten percent (10%) of the contract holder then invested in equity-based subaccounts into relatively better performing sectors providing support to the market index at the current market levels. For example, seventy percent (70%) of said ten percent (10%) is allocated into equity based subaccounts relating to the health care sector and the remaining 30% of the 10% are allocated into those relating to the banking sector. If at the current value of the market index the telecom sector is comparatively providing stronger support to the market index, and the health care sector is contributing towards the reduction in the value of the market index, then the previously allocated seventy percent (70%) of said ten percent (10%) contract holder funds in the health care sector is reallocated into telecom sector focused equity based subaccounts. The mentioned reallocation of the funds from the health care sector into the telecom sector ensures security and higher returns on the contract holder funds thereby ensuring that the guarantor or the insurance company selling the variable annuity product is at least able to meet the GMIB payment stream levels.

In one embodiment, the index evaluator 140 evaluates the market sectors governing a market index and rates every market sector on a risk scale of one (1) to ten (10) with one being the lowest and ten being the highest. Other scale increments and boundaries may be substituted for risk assessment of the market sectors. In one embodiment, the measuring unit to evaluate the risk of each market sector can be alpha numeric, alphabetic and the like. The movement of funds into various market sectors depends on the rating provided by the risk scale for the various market sectors. The risk scale is defined by parameters that include, but need not be limited to, return on investment of a financial market sector for a specific time period, sustenance of a particular financial market sector under dynamic market scenarios, and/or amount of volatility experienced by the various market sectors in a defined time period. The performance of a particular market sector for a specific time period is determined based on the relative comparison of that particular market sector with the rest of the market sectors governing a market index. The performance is can be ascertained on rate of return on the invested amount, keeping in check the relative sector volatility, and/or sustenance of a particular market sector during dynamic market conditions. For example, market sector A provides ten percent (10%) annual rate of return on a given amount of $1,000, and market sector B provides eight-and-a-half percent (8.5%) annual rate of return; however, in the last year, market sector A has experienced more volatility in comparison to market sector B; moreover, market sector B has experienced more sustenance during the given time period than market sector A. Therefore, the risk scale based on comprehensive inter-related analysis of mentioned parameters formulates a rating of seven (7) to market sector B and a rating of six (6) to market sector A. Since, market sector B has a better risk scale rating of seven (7) and provides for less financial risk for both the guarantor of the variable annuity product and the contract holder, therefore, market sector B is selected over market sector A for movement or reallocation of contract holder funds.

In an exemplary scenario, if the above-mentioned reallocation of ten percent (10%) of the contract holder funds into relatively better performing sectors is not able to meet the GMIB payment stream levels, then the remaining ninety percent (90%) of the contract holder funds invested into relatively secure subaccounts are reallocated as per the requirement into equity based subaccounts and/or into better fixed-return-based subaccounts. For example, fifty percent (50%) of said ninety (90%) of contract holder funds invested into Certificate Deposits provides a seven percent (7%) guaranteed annual return. However, certain market sectors such as FMCG and Energy are providing higher sustained annual returns of more than the seven percent (7%) provided by the Certificate Deposits. The asset allocator 130 of the funds management system 100 reallocates said fifty (50%) of said ninety (90%) of contract holder funds previously invested in Certificate Deposits into the FMCG and the Energy sector based subaccounts such as shares, stocks, mutual funds, futures, options, derivatives, and sector based index funds among others in order to at least meet the GMIB payment stream level.

In one embodiment, the variable annuity product operating on the system and method disclosed herein is unable to meet the GMIB payment stream levels, then the guarantor and/or the insurance company offering the variable annuity product pays for the deficit amount out of its own funds in order to meet the GMIB payment stream levels.

In one embodiment, at block 206, the index evaluator 140 determines the change in the value of the market index. In one embodiment, the change in the value of the market index is a decrease in the value of the market index by at least a pre-determined fixed percentage value, numeric value, and/or set threshold level. At block 207, the index evaluator 140 determines the specific market sectors and their relative contribution towards supporting the decrease in the value of the market index. At block 208, the index evaluator 140 on at least a pre-determined decrease in the value of the market index compares the current value of the market index to a previously sustained value of the market index. The previously sustained value of the market index is the value of the market index at which the last reallocation of the funds was actuated by the asset allocator 130. In one embodiment, the previously sustained value of the market index is the initial value of the market index at which the initial allocation of the contract holder funds was actuated. At block 209, if the current value of the market index is less than the previously sustained value of the market index, then the index evaluator 140 compares the present value of the market index to the required value of the market index for ensuring the GMIB payment stream to the contract holder. At block 211, if the present value of the market index is at least meeting the required levels to ensure GMIB payment stream to the contract holder, then the asset allocator 130 reallocates at least a portion of the funds in order to avoid for further depreciation of the account value of the variable annuity product.

In an exemplary scenario, ninety percent (90%) of the funds of a contract holder with a profile score of nine (9) are allocated into equity based subaccounts such as mutual funds, shares, bonds, futures, options, and the like. The remaining ten percent (10%) is invested into federal bonds, certificate deposits, recurring deposits and other secured fixed return based subaccounts. If the change in the value of the market index is below the previously sustained value of the market index but meets the required market index levels to ensure the GMIB payment stream, then the ninety percent (90%) of contract holder funds allocated into equity based subaccounts are reallocated in total or in phased manner in accordance with the value of the market index into passive subaccounts providing fixed return. The mentioned reallocation ensures that the contract holder funds do not suffer from further depreciation and are automatically protected from financial down-market conditions.

In one embodiment, at block 206, the index evaluator 140 of the funds management system 100 determines the change in the value of the market index. In one embodiment, the change in the value of the market index is a decrease in the value of the market index by at least a pre-determined fixed percentage value, numeric value, and/or set threshold level. At block 207, the index evaluator 140 determines the specific market sectors and their relative contribution towards supporting the decrease in the value of the market index. At block 208, the index evaluator 140, on a predetermined decrease in the value of the market index, compares the current value of the market index to a previously sustained value of the market index. The previously sustained value of the market index is the value of the market index at which the last reallocation of funds was actuated by the asset allocator 130. In one embodiment, the previously sustained value of the market index is the initial value of the market index at which the initial allocation of the contract holder funds was actuated. At block 212, if the current value of the market index is greater than the previously sustained value of the market index, then the asset allocator 130 reallocates at least a portion of the funds previously invested in market-sector-specific subaccounts into relatively better performing market sectors.

In an exemplary scenario, sixty percent (60%) of the funds of a contract holder with a profile score of six (6) are allocated into equity based subaccounts such as mutual funds, shares, shares, futures, derivatives, options, and the like. The remaining forty percent (40%) is invested into subaccounts providing fixed rates of return. If the current value of the market index is greater than the previously sustained value of the market index, then sixty percent (60%) of the contract holder funds allocated into the equity based sector specific subaccounts are reallocated in total or in phased manner in accordance with the value of the market index into relatively better performing market sectors, thereby providing better returns on the contract holder funds. For example, one-third of said sixty percent (60%) of the contract holder funds are allocated into equity based subaccounts relating to the automobile and ancillary sector, and the remaining two-third of the sixty percent (60%) of contract holder funds is equally distributed between infrastructure and technology. If at the current value of the market index the FMCG and the energy sector as per the risk scale parameters are comparatively providing stronger sustained support to the market index, then at least a portion of the presently invested sixty percent (60%) of the contract holder funds into the above-mentioned market sectors is reallocated into the FMCG and the energy sector. The risk scale is defined by parameters that include, but need not be limited to, return on investment of a financial market sector for a specific time period, sustenance of a particular financial market sector under dynamic market scenarios, and/or amount of volatility experienced by the various market sectors in a defined time period. In one embodiment, the risk scale based on the interrelated study of the parameters provides a rating of nine (9) to the FMCG sector, seven (7) to the energy sector, six (6) to the automobile and ancillary sector, five (5) to the infrastructure sector, and a rating of four (4) to the technology sector. The asset allocator 130 based on the above-mentioned risk scale ratings reallocates fifty percent (50%) of the one third of the total contract holder funds presently invested in the technology sector into the FMCG sector. Simultaneously, the asset allocator 130 reallocates the remaining fifty percent (50%) of the one-third of the contract holder funds presently invested in the technology sector equally into the energy sector and the automobile and ancillary sector. The asset allocator 130 actuates the reallocation of the contract holder funds from the technology sector into the FMCG, the energy and the automobile and ancillary sector based on the respective rating provided to each market sector by the risk scale. The rating-based reallocation ensures better financial security and higher returns on the contract holder funds thereby ensuring that the guarantor or the insurance company selling the variable annuity product is able to at least meet the GMIB payment stream levels.

In one embodiment, at block 206, the index evaluator 140 determines the change in the value of the market index. In one embodiment, the change in the value of the market index is an increase in the value of the market index by at least a pre-determined fixed percentage, numeric value, or set threshold level. At block 213, the index evaluator 140 on a pre-determined increase in the value of the market index, determines the specific market sectors relatively supporting the increase in the value of the market index. In one embodiment, at block 214, the asset allocator 130 reallocates at least a portion of the funds previously invested into fixed return based subaccounts into sector specific subaccounts of those market sectors providing support to the increase in the value of the market index. The percentage reallocation of funds into each of the identified market sectors is based on the relative contribution of the identified market sectors towards the increase in the value of the market index. In another embodiment, at block 214, the asset allocator 130 reallocates at least a portion of the funds previously invested into market sectors relatively not supporting the increase in the value of the market index into relatively better performing market sectors that are supporting the increase in the value of the market index.

In one exemplary scenario, sixty percent (60%) of the funds of a contract holder with a profile score of six (6) are allocated into equity based subaccounts such as mutual funds, shares, bonds, futures, options, and the like. The remaining forty percent (40%) of the contract holder funds are invested into passive subaccounts providing fixed returns. If the increase in the value of the market index is by a predetermined fixed percentage value, numeric value, and/or set threshold level, then said forty (40%) of the contract holder funds allocated into fixed return based subaccounts are reallocated in total or in phased manner in accordance with the value of the market index into market sector based subaccounts, thereby providing better returns on the contract holder funds. The chosen sectors are those that have enabled the increase in the value of the market index.

In one embodiment, the index evaluator 140 evaluates the market sectors governing a market index and rates every market sector on a risk scale of one (1) to ten (10) with one being the lowest and ten being the highest. Other scale increments and boundaries may be substituted for the risk assessment of the market sectors. In one embodiment, the measuring unit used to evaluate the risk of each sector can be alpha numeric, alphabetic and the like. The movement of funds into various market sectors depends on the rating provided by the risk scale to the various market sectors. The risk scale is defined by parameters that include, but need not be limited to, return on investment of a financial market sector for a specific time period, sustenance of a particular financial market sector under dynamic market scenarios, and/or amount of volatility experienced by the various market sectors in a defined time period. The performance of a particular market sector for a specific time period is determined based on the relative comparison of that particular market sector with the rest of the market sectors governing a market index. The performance is can, for example, be ascertained based on the rate of return on the invested amount, keeping in check the relative sector volatility, and/or sustenance of a particular market sector during dynamic market conditions. For example, market sector A provides a ten percent (10%) annual rate of return on $1,000, and market sector B provides an eight-and-a-half percent (8.5%) annual rate of return on the same $1,000. However, in the last year, sector A has experienced more volatility in comparison to market sector B. Furthermore, market sector B has experienced more sustained performance (i.e., relatively less volatility) during the same time period than market sector A. Therefore, the risk scale based on comprehensive interrelated analysis of mentioned parameters formulates a rating of seven (7) to market sector B and a rating of six (6) to market sector A. Since, market sector B has a better risk scale rating of seven (7) and provides for less financial risk for both the guarantor of the variable annuity product and the contract holder, market sector B is selected over market sector A for movement or reallocation of contract holder funds. In one embodiment, the automated funds management system 100 actuates the changes in the allocation of contract holder funds based on a combination of and/or a cumulative of more than one market indices. The list of market indices includes but not limited to Dow Jones, NASDAQ, NIFTY, FTSE-100, Nikkei, SENSEX and HKEX, among others. In one embodiment, the various components of the funds management system are networked to the information providers of the various market indices as mentioned above.

Figure 2:
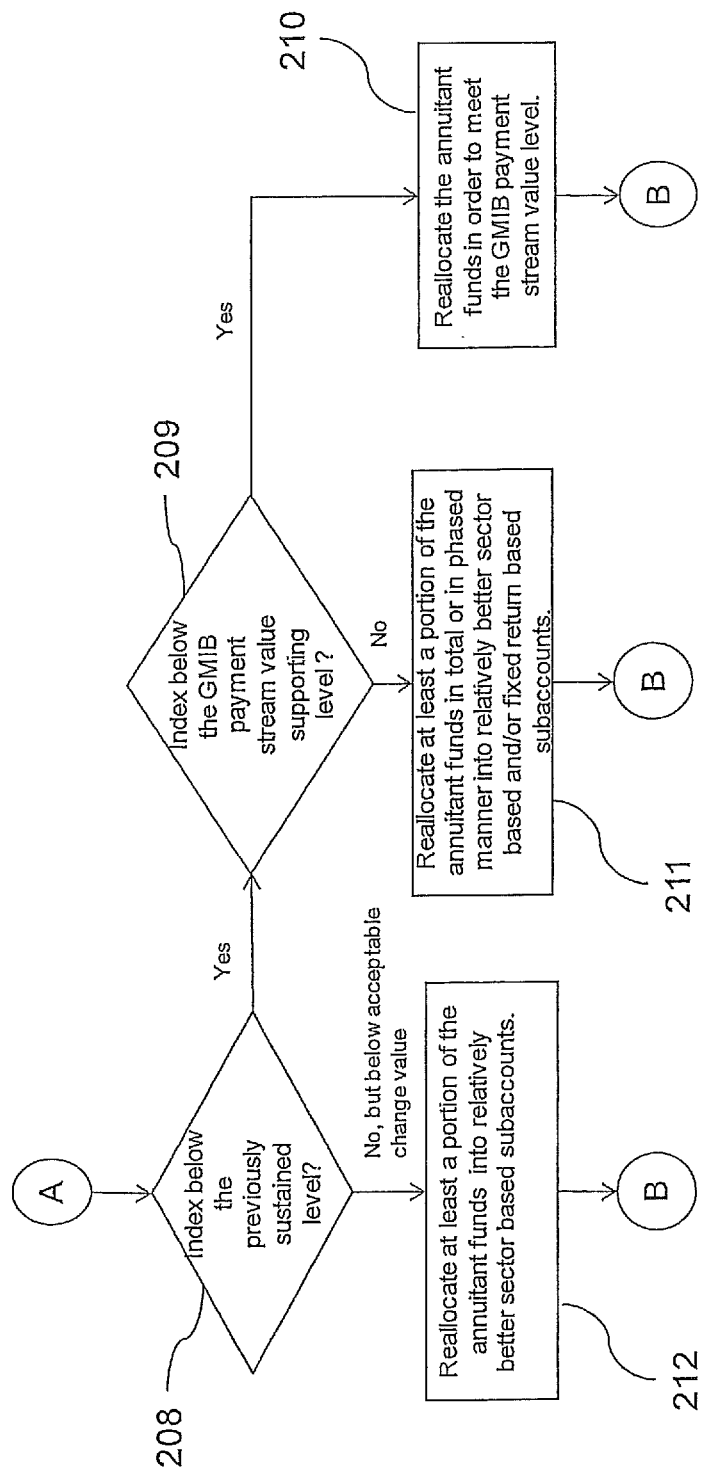
Figure 3:
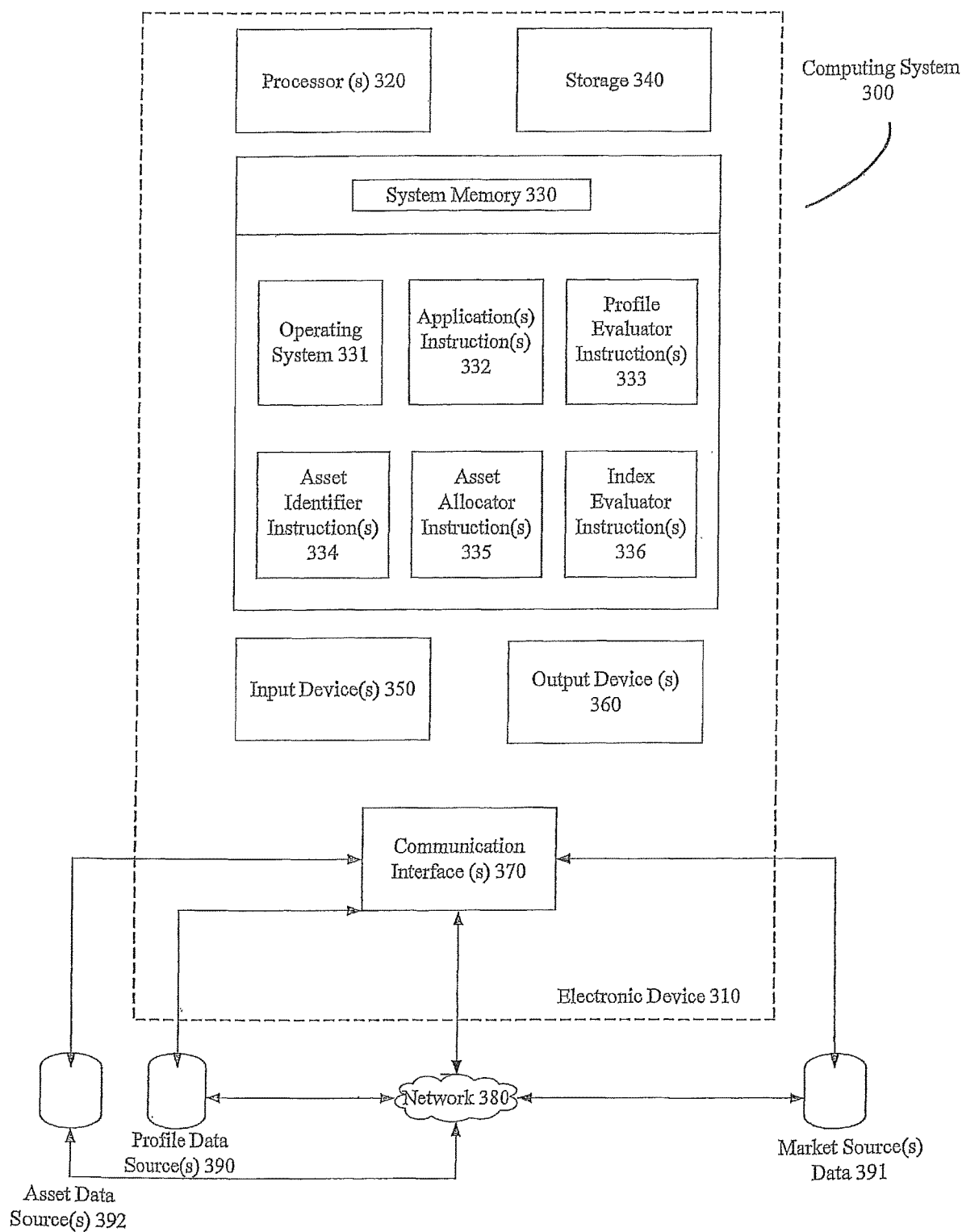
FIG. 3 illustrates an exemplary block diagram of the machine actuating the automated funds management system and method of the present disclosure as illustrated in FIGS. 1, 2A and 2B.

FIG. 3 shows a block diagram of a computing system 300 including a representative electronic device 310 operable to support embodiments of system-implemented methods, system program products, and system components to implement the strategies, system-implemented methods, and rules as illustrated in FIGS. 1 & 2. In an illustrative embodiment, the electronic device 310 may implement one or more of the components of the system 100 of FIG. 1.

The representative electronic device 310 includes at least one processor 320, system memory 330, storage medium 340, input device(s) 350, output device 360, communication interface 370. The processor(s) 320 includes, for example, microprocessors, microcomputers, microcontrollers, digital signals processors, central processing units, state machines, logic circuitries, and/or any devices that manipulate data based on operational instructions. The processor(s) 320 can be configured to fetch and execute computer-program instructions stored in system memory 330. Generally, computer-program instructions can include routines, programs, objects, components, data structures, procedures, modules, functions, and the like that perform particular functions or implement particular abstract data types.

The system memory 330 may correspond to the automated funds management system 100 of FIG. 1. Depending on the configuration and type of the electronic device 310, the system memory 330 may be volatile (such as random access memory or "RAM"), non-volatile (such as read-only memory or "ROM," and similar memory devices that maintain stored data even when power is not provided) or some combination of the two. In the embodiment illustrated in FIG. 3, the system memory 330 typically includes operating system instruction(s), applications instruction(s), profile evaluator instruction(s) 333, asset identifier instruction(s) 334, asset allocator instruction(s) 335, and index evaluator instruction(s) 336. The profile evaluator instruction(s) 333 correspond to the profile evaluator 120 of FIG. 1, the asset identifier instruction(s) 334 correspond to asset identifier 120 of FIG. 1, the asset allocator instruction(s) 335 correspond to asset allocator 130 of FIG. 1, and index evaluator instruction(s) 336 correspond to index evaluator 140 of FIG. 1.

Processor(s) 320 fetches and executes computer program instructions from the applications instruction(s) 332. In one embodiment, the applications instruction(s) 332 receives the instructions for reallocation of funds from the asset allocator instruction(s) 335. The cumulative and interrelated functioning of the various instruction modules of the computing system 300 is enabled by the application's instruction(s) 332. Alternatively, the application's instruction(s) 332 may be located at multiple devices, where the multiple devices are part of a distributed system environment. In this case, one or more of the multiple devices of the distributed system may comprise the representative device 310. In one embodiment, the application's instruction(s) 332 includes programs that supplement applications on any computing based device such as word processor applications, spreadsheet applications, and the like.

The electronic device 310 may also have additional features or functionality. In one embodiment the electronic device 310 includes removable and/or non-removable data storage devices such as magnetic disks, optical disks, tape, and memory cards. Such additional storage is illustrated in FIG. 3 by storage 340. System storage media may include volatile and/or non-volatile storage and removable and/or non-removable media implemented in any method or technology for storage of information such as system-readable instructions, data structures, program components or other data. The system memory 330 and the storage 340 are examples of system storage media. The system storage media includes, but need not be limited to, RAM, ROM, electrically erasable programmable read-only memory (EEPROM), or other memory technology, compact disks (CD), digital versatile disks (DVD) or other optical storage, magnetic cassettes, magnetic tape, magnetic disk storage or other magnetic storage devices, or any other tangible non-transitory medium that can be used to store information and that can be accessed by device 310. Any such system storage media may be part of the device 310. The device 310 may also have input device(s) 350, such as a keyboard, mouse, pen, voice input device, touch input device, etc. Output device(s) 360, such as a display, speakers, a printer, etc. may also be included.

In one embodiment, the storage 340, stores the data required for executing the operational steps of the system and method described in FIG. 1 and FIG. 2. The storage 340 may include the data relating to the previous reallocation executed on a contract holder account. The profile of the contract holder may be stored along with the account value of the variable annuity within the storage 340.

The electronic device 310 also includes one or more communication interface(s) 370 that allow the electronic device 310 to communicate with one or more data sources/databases. In one embodiment, the electronic device 310 communicates via a network connection with various data sources such as contract holder profile data source(s) 390, financial market data source(s) 391, and asset data source(s) 392. In the embodiment, the data resident on the contract holder profile data source(s) 390, the financial market data source(s) 391, and the asset data source(s) 392 is locally accessible to the device 310 via the storage media 340.

In one embodiment, the electronic device contains profile evaluator instruction(s) 333, which when executed by the processor(s) 320 extract and/or update the profile data from at least one profile data source(s) or database 390. In one embodiment, the database is a remote database connected to the funds management system 100 via a network. The profile evaluator instruction(s) 333, evaluate, and/or update and/or extract profile data such as age, marital status, gender of the contract holder, and those of the beneficiary, details relating to the assets and liabilities, information relating to the number of dependents, financial goals, and their priority in terms of dollar value and timing, current and future expenses, current and future income, anticipated large expenditures such as educational expenses, buying a house, annual travel budget, and the like.

In one embodiment, the profile evaluator instruction(s) 333, which when executed by the processor(s) 320, evaluate the profile of the contract holder and score the profile on a scale of one (1) to ten (10). Other scale increments and boundaries may be substituted to ascertain the profile score. A profile score of one (1) is assigned to the most conservative financial profile and a profile score of ten (10) is assigned to the most aggressive financial profile. In one embodiment, a score of one (1) to three (3) is considered under the conservative section, a score of four (4) to seven (7) is considered under the balanced section, and a score of eight (8) to ten (10) is considered under the growth section. Of course, this scaling can be reversed should one choose to do so without affecting the disclosure disclosed herein. In one embodiment, the profile evaluator instruction(s) 333, which when executed by the processor(s) 320 determine the GMIB payment stream value based on the supplied profile data and the assigned profile score. In one embodiment, the profile score, the related profile data and the required GMIB payment stream value for a contract holder are stored within the storage 340 for future local access.

In one embodiment, the asset identifier instruction(s) 334, which when executed by the processor(s) 320 firstly provide for recommendations for percentage distribution of funds into given asset classes, and secondly suggest the right set of subaccounts belonging to the respective asset classes. The provided recommendations for percentage distribution of funds into given asset classes and the identification of subaccounts depends on the profile score and the GMIB payment stream value that the profile evaluator assigns to the overall profile of the contract holder. The asset classes include, but need not be limited to, stocks and equities, fixed income or bonds, money market or cash equivalents, and real estate or other tangible assets. The data relating to the profile of the contract holder including the profile score, and the GMIB payment stream value is accessed through the network 380 via the communication interface(s) 370 from a remote profile data source(s) 390, and/or locally from the storage 340 of the electronic device 310. In one embodiment, a contract holder profile with a score of three (3) will include more of passive subaccounts such as federal bonds, certificate deposits, recurring deposits, fixed deposits, and other principal protected funds (those with fixed return on investment). In one embodiment, a contract holder profile with a score of six (6) will have a mix of passive subaccounts and actively managed equity exposed subaccounts such as shares, stocks, futures, derivatives, market exposed mutual funds, Exchange Traded funds (ETFs), and sector based funds, and the like. In one embodiment, a contract holder profile with a score of nine (9) will have more of actively managed equity based investments such as mutual funds, Exchange Traded Funds (ETFs), sector based funds, shares, futures, derivatives, options and the like.

The asset identifier instruction(s) 334, which when executed by the processor(s) 320 fetch various asset related information from at least one asset data source/database 392. The asset data source(s) 392 includes, but need not be limited to, various databases of third party financial institutions, banking and non-banking financial organizations, financial planning organizations, financial advisor blogs and finance based web portals and any networked medium providing information on financial products and/or financial sector. In one embodiment, the asset data is fetched internally from the storage 340, which maintains the details of the available financial products In one embodiment, the provided automated recommendations and suggestions relating to asset class percentage distribution and subaccounts can be changed by the operator of the funds management system 100. In one embodiment, the operator is a financial advisor, wealth manager, financial organization, insurance company, contract holder, guarantor, of the variable annuity and/or the beneficiary among others.

In one embodiment, the asset allocator instruction(s) 334, which when executed by the processor(s) 320, provide for automated allocation of the funds into the asset identifier 120 identified subaccounts. In one embodiment, the funds management system 100 includes an index evaluator 140 for determining the change in the value of a market index, a change in the value of the market index by a predetermined value or percentage value actuates the asset allocator 130 to reallocate at least a portion of the funds into various market sectors, subaccounts, and/or financial products providing support to the value of the market index. In one embodiment, the financial market sectors include, but need not be limited to, Automobile and Ancillary sector, Technology sector, Banking sector, Manufacturing sector, FMCG (Fast Moving Consumer Goods) sector, Healthcare sector, Telecom sector, Energy sector, and Infrastructure sector among others. In one embodiment, the change in the value of the market index is captured based on a set percentage value, or a set numeric value, and/or a set threshold value.

In one embodiment, the contract holder is an individual, organization, natural person, legal entity, and/or group of persons.

In one embodiment, the electronic device 310 receives through the network 380 via the communication interface(s) 370 financial market data from the various financial market data source(s) 391. The applications instruction(s) 332 receives the financial market data and supplies the received financial market data to the various embodiments of the automated funds management system 100 forming a part of the represented electronic device 300 of FIG. 3. The index evaluator instruction(s) 336, which when executed, determines the change in the value of the market index. The index evaluator 140, on a pre-determined change in the value of the market index, provides instruction(s) 336 to compare the current value of the market index to a previously sustained value of the market index. The previously sustained value of the market index is the value of the market index at which the last reallocation of funds was actuated based on the asset allocator instruction(s) 335 received from the asset allocator 130. In one embodiment, the previously sustained value of the market index is the initial value of the market index at which the initial allocation of the contract holder funds was actuated. In one embodiment, the current value of the market index is greater than the previously sustained value of the market index, then the asset allocator 130 provides asset allocator instruction(s) 335 to reallocate at least a portion of the funds previously invested into market sector specific subaccounts into relatively better performing market sectors.

In an exemplary scenario, sixty percent (60%) of the funds of a contract holder with a profile score of six (6) are allocated into actively managed equity based subaccounts such as mutual funds, shares, stocks, futures, options, derivatives, and the like. The remaining forty percent (40%) of the contract holder funds are invested into subaccounts providing fixed returns. If the current value of the market index is greater than the previously sustained value of the market index, then sixty percent (60%) of the contract holder funds allocated into the equity based market sector specific subaccounts are reallocated in total or in phased manner in accordance with the value of the market index into relatively better performing market sectors thereby providing better returns on the contract holder funds. For example, one-third of the sixty percent (60%) of the contract holder funds are allocated into equity based subaccounts relating to the automobile and ancillary sector and the remaining two-third of the sixty percent (60%) contract holder funds is equally distributed in between infrastructure and technology. If at the current value of the market index the FMCG and the energy sector as per the risk scale parameters are comparatively providing stronger sustained support to the market index, then at least a portion of the presently invested 60% of the contract holder funds into the above-mentioned market sectors is reallocated into the FMCG and the energy sector. The risk scale is defined by parameters that include, but need not be limited to, return on investment of a financial market sector for a specific time period, sustenance of a particular financial market sector under dynamic market scenarios, and/or amount of volatility experienced by the various market sectors in a defined time period. In one embodiment, the risk scale based on the interrelated study of the parameters provides a rating of nine (9) to the FMCG sector, seven (7) to the energy sector, six (6) to the automobile and ancillary sector, five (5) to the infrastructure sector, and a rating of four (4) to the technology sector. The asset allocator 130 based on the above-mentioned risk scale ratings reallocates fifty percent (50%) of the one third of the total contract holder funds presently invested in the technology sector into the FMCG sector. Simultaneously, the asset allocator 130 reallocates the remaining fifty percent (50%) of the one-third of the contract holder funds presently invested in the technology sector equally into the energy sector and the automobile and ancillary sector. The asset allocator 130 actuates the reallocation of the contract holder funds from the technology sector into the FMCG, the energy and the automobile and ancillary sector based on the respective rating provided to each sector by the risk scale. The rating based reallocation ensures better financial security and higher returns on the contract holder funds thereby ensuring that the guarantor or the insurance company selling the variable annuity product is able to at least meet the GMIB payment stream levels.

The communication interfaces 370 are an example of communication media. Communication media include wired media such as a wired network or direct-wired connection, and wireless media, such as acoustic, radio frequency (RF), infrared and other wireless media. It will be appreciated that not all of the components or devices illustrated in FIG. 3 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those skilled in the art would further appreciate that the various illustrative logical blocks, configurations, modules, and process or instruction steps described in connection with the embodiments disclosed herein may be implemented as electronic hardware, system software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of the method described in connection with the embodiments disclosed herein may be embodied directly in hardware, in a software module executed by a processor, or in a combination of the two. A software module may reside in system readable media, such as random access memory (RAM), read only memory (ROM), registers, a hard disk, a removable disk, a CD-ROM, or any other form of storage medium. An exemplary storage medium is coupled to the processor such that the processor can read information from, and write information to, the storage medium. In the alternative, the storage medium may be integral to the processor or the processor and the storage medium may reside as discrete components in a device or system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The system and method disclosed herein contemplate uses in association with web services, utility computing, pervasive and individualized computing, security and identity solutions, autonomic computing, commodity computing, mobility and wireless solutions, open source, biometrics, grid computing and/or mesh computing.

Any databases/data sources described herein may include relational, hierarchical, graphical, or object-oriented structure and/or any other database configurations. The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web contract holder may be further equipped with an Internet browser connected to the Internet or an intranet using standard dial-up, cable, DSL or any other Internet protocol known in the art. Transactions originating at a web contract holder may pass through a firewall in order to prevent unauthorized access from users of other networks.

Firewall may include any hardware and/or software suitably configured to protect components and/or enterprise computing resources from users of other networks. Further, a firewall may be configured to limit or restrict access to various systems and components behind the firewall for web contract holders connecting through a web server. Firewall may reside in varying configurations including Stateful Inspection, Proxy based and Packet Filtering among others. Firewall may be integrated within a web server or any other components or may further reside as a separate entity.

The computing system 300 described herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, database, databases or displays described herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like.

A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, Macromedia Cold Fusion, Microsoft Active Server Pages, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a contract holder-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system and method disclosed herein may be embodied as a customization of an existing system, an add-on product, upgraded software, a standalone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable database medium having computer-readable program code means embodied in the database medium. Any suitable computer-readable database medium may be utilized, including hard disks, CD-ROM, optical database devices, magnetic database devices, and/or the like.

The system and method is described herein with reference to screen shots, block diagrams and flowchart illustrations of methods, apparatus (e.g., systems), and computer program products according to exemplary embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Finally, it should be understood that various principles of the disclosure have been described in illustrative embodiments. However, many combinations and modifications of the above-described components, used in the practice of the disclosure, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the disclosure. It should be understood that the detailed description and specific examples, indicating exemplary embodiments of the disclosure, are given for purposes of illustration only and not as limitations. Many changes and modifications within the scope of the instant disclosure may be made without departing from the spirit thereof, and the disclosure includes all such modifications. Corresponding structures, materials, acts, and equivalents of all elements in the claims below are intended to include any structure, material, or acts for performing the functions in combination with other claim elements as specifically claimed. The scope of the disclosure should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

What is claimed is:

1. A system-implemented method of initiating electronic distributions, the method comprising:
    generating a distributed system of electronic devices that utilize encrypted communications to initiate the electronic distributions;
    configuring a particular electronic device in the distributed system to perform a set of operations, the set of operations comprising:
        extracting and encrypting, by a profile evaluator executed by a processor of the particular electronic device in the distributed system that includes a network interface configured to communicate electronic distributions to a first subaccount and a second subaccount, profile data associated with at least one database and a recipient for transmission in response to an indication that the profile data has been generated, wherein the profile evaluator compresses the profile data after extracting the profile data and prior to encrypting the profile data;
        recommending, by an asset identifier executed by the processor, a distribution of at least a portion of funds into at least one asset class based on the profile data, wherein the asset identifier generates recommendation data based on the distribution and encrypts the recommendation data for transmission to at least one other electronic device in the distributed system in response to an indication that the recommendation of the distribution has been completed;
        identifying, by the asset identifier executed by the processor, the first subaccount and the second subaccount for investment based on the distribution and the profile data, wherein the first subaccount is associated with a first market sector and the second subaccount is associated with a second market sector, wherein the asset identifier generates and encrypts account data based on the identification for transmission to the at least one other electronic device in the distributed system in response to an indication that the identification of the first and second subaccounts has been completed;

allocating, by an asset allocator executed by the processor, a first portion of the funds into the first subaccount and a second portion of the funds into the second subaccount, wherein the asset allocator generates allocation data representative of the allocations and encrypts the allocation data for transmission to the at least one other electronic device in the distributed system in response to an indication that the allocation of the first and second portion of the funds has been completed;

determining, by an index evaluator executed by the processor, a change in value of at least one market index, wherein the index evaluator generates change data indicative of the change in value and encrypts the change data for transmission to the at least one other electronic device in the distributed system in response to an indication that the determination of the change in value has been completed;

determining, by the index evaluator executed by the processor, relative contributions of the first market sector and the second market sector to the change in the value of the at least one market index, wherein the index evaluator generates data indicative of the relative contributions and encrypts the data for transmission to the at least one other electronic device in the distributed system in response to an indication that the determination of the relative contributions has been completed;

automatically reallocating, by the asset allocator executed by the processor, funds between the first subaccount and the second subaccount based on the relative contributions of the first market sector and the second market sector to the change in the value of the at least one market index, wherein the asset allocate generates fund reallocation data indicative of the reallocated funds and encrypts the fund reallocation data for transmission to the at least one other electronic device in the distributed system in response to an indication that the reallocation of the funds has been completed; and initiating, at the electronic device, using the network interface, an electronic distribution on behalf of an issuer, wherein the profile data, the first subaccount, and the second subaccount include security information that establishes an access level, the access level indicating that the recipient has exclusive rights to delete the profile data, the first subaccount, and the second subaccount;

compressing results of the set of operations and encrypting the compressed results; and transmitting the encrypted and compressed results to at the least one other electronic device in the distributed system, the at least one other electronic device secured by a particular access code.

2. The system-implemented method of claim 1, wherein the profile data includes:
- age, marital status, gender, or any combination thereof of a contract holder,
- age, marital status, gender, or any combination thereof of a beneficiary,
- details relating to assets and liabilities,
- information relating to dependents,
- financial goals,
- priority of the financial goals in terms of dollar value and timing,
- anticipated expenses,
- anticipated income,
- anticipated expenditures,
- or any combination thereof.

3. The system-implemented method of claim 1, wherein the electronic distribution is initiated, on behalf of the issuer, in the distributed system, based on a reduced metric as compared to initiating the electronic distribution without the reallocating, and wherein the change corresponds to a decreased value of the at least one market index.

4. The system-implemented method of claim 3, wherein the decreased value of the at least one market index supports a guaranteed minimum income benefit (GMIB) payment stream level.

5. The system-implemented method of claim 3, wherein the decreased value of the at least one market index does not support a guaranteed minimum income benefit (GMIB) payment stream level, and wherein the asset allocator automatically reallocates at least some of the funds to meet the GMIB payment stream level.

6. The system-implemented method of claim 4, wherein the asset allocator reallocates the funds between the first subaccount and the second subaccount in a phased manner.

7. The system-implemented method of claim 1, wherein the change corresponds to an increased value of the at least one market index.

8. The system-implemented method of claim 1, further comprising determining by the index evaluator a change in the value of more than one market index.

9. The system-implemented method of claim 7, wherein the increased value of the at least one market index supports a guaranteed minimum income benefit (GMIB) payment stream level.

10. The system-implemented method of claim 1, further comprising determining by the profile evaluator a guaranteed minimum income benefit (GMIB) payment stream level based on the profile data.

11. The system-implemented method of claim 1, wherein the asset allocator is configured to reallocate funds into subaccounts comprising certificate of deposit, recurring deposit, fixed deposit, stocks, futures, sector based funds, sector based indexes, bonds, passively managed subaccounts, actively managed subaccounts, exchange traded funds, derivatives, options, annuities, or any combination thereof.

* * * * *